US012617730B2

(12) United States Patent
Mehr et al.

(10) Patent No.: US 12,617,730 B2
(45) Date of Patent: May 5, 2026

(54) DIRECT BONDED ENVIRONMENTAL BARRIER COATINGS FOR SIC/SIC COMPOSITES AND METHODS FOR PREPARING THE SAME

(71) Applicant: HONEYWELL INTERNATIONAL INC., Charlotte, NC (US)

(72) Inventors: Mehrad Mehr, Morris Plains, NJ (US); Bahram Jadidian, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1072 days.

(21) Appl. No.: 17/657,227

(22) Filed: Mar. 30, 2022

(65) Prior Publication Data

US 2023/0312424 A1 Oct. 5, 2023

(51) Int. Cl.
| | |
|---|---|
| *C04B 41/89* | (2006.01) |
| *C04B 35/565* | (2006.01) |
| *C04B 35/80* | (2006.01) |
| *C04B 41/45* | (2006.01) |
| *C04B 41/50* | (2006.01) |
| *C04B 41/87* | (2006.01) |

(52) U.S. Cl.
CPC ........... *C04B 35/80* (2013.01); *C04B 35/565* (2013.01); *C04B 41/4535* (2013.01); *C04B 41/5045* (2013.01); *C04B 41/87* (2013.01); *C04B 41/89* (2013.01); *C04B 2235/3427* (2013.01); *C04B 2235/3826* (2013.01); *C04B 2235/9607* (2013.01)

(58) Field of Classification Search
CPC ..... C04B 41/5045; C04B 41/87; C04B 41/89; C04B 2235/3427
See application file for complete search history.

(56) References Cited

U.S. PATENT DOCUMENTS

| | | |
|---|---|---|
| 8,940,417 B2 | 1/2015 | Courcot et al. |
| 9,005,717 B2 | 4/2015 | Kirby et al. |
| 9,926,238 B2 | 3/2018 | Herakles et al. |
| 10,604,454 B1 | 3/2020 | Zhu et al. |
| 11,078,798 B2 | 8/2021 | Kirby |

(Continued)

FOREIGN PATENT DOCUMENTS

| | | |
|---|---|---|
| EP | 2379471 B1 | 2/2015 |
| JP | 4753568 B2 | 8/2011 |

(Continued)

*Primary Examiner* — Nathan H Empie
(74) *Attorney, Agent, or Firm* — Ingrassia Fisher & Lorenz LLP

(57) ABSTRACT

A method of preparing a ceramic matrix composite (CMC) article is disclosed. The method includes depositing a first layer of a coating composition directly onto a surface of a silicon carbide fiber-reinforced silicon carbide matrix (SiC/SiC) composite substrate, with the coating composition comprising a rare earth silicate and a sintering aid. The method also includes heating the first layer to sinter the coating composition to form an environmental barrier coating (EBC) adjacent the SiC/SiC composite and a transition layer integrally bonded to and between the substrate and the EBC. CMC articles prepared according to the method, including coated turbomachine components, are also disclosed.

17 Claims, 3 Drawing Sheets

(56)                    References Cited

U.S. PATENT DOCUMENTS

| | | | |
|---|---|---|---|
| 12,358,842 B2 | 7/2025 | Hinoki et al. | |
| 2006/0210800 A1* | 9/2006 | Spitsberg | C04B 41/87 |
| | | | 428/408 |
| 2014/0255680 A1 | 9/2014 | Lee et al. | |
| 2016/0312628 A1 | 10/2016 | Kirby | |
| 2018/0347049 A1* | 12/2018 | Oboodi | F01D 5/288 |
| 2020/0055083 A1 | 2/2020 | Beals et al. | |
| 2020/0199031 A1 | 6/2020 | Luthra et al. | |
| 2021/0261474 A1 | 8/2021 | Jadidian et al. | |
| 2021/0276925 A1 | 9/2021 | Shi et al. | |

FOREIGN PATENT DOCUMENTS

| | | | |
|---|---|---|---|
| WO | 2018212139 A1 | 11/2018 | |
| WO | 2022003273 A1 | 1/2022 | |

* cited by examiner

DIRECT BONDED ENVIRONMENTAL BARRIER COATINGS FOR SIC/SIC COMPOSITES AND METHODS FOR PREPARING THE SAME

TECHNICAL FIELD

The present disclosure relates generally to protective coatings for engine components and, more specifically, to direct bonded environmental barrier coatings (EBC) for silicon-based ceramic substrates using an integrally formed transition layer, parts prepared therewith, methods of preparing such coated parts.

BACKGROUND

Gas turbine engines are used as the primary power source for various kinds of aircraft and other vehicles. The engines may also serve as auxiliary power sources that drive air compressors, hydraulic pumps, and industrial electrical power generators. Demands for engine efficiency have led to higher operating temperatures and new component materials suitable for use under resulting conditions. For example, parts fabricated from ceramic matrix composites (CMCs) are increasingly employed, as such materials exhibit improved mechanical, physical, and chemical properties at high temperatures compared to parts made from conventional metal alloys (e.g. nickel-based superalloys).

CMCs are composed of a ceramic matrix phase and reinforcing fibers or particles, and Common materials used for both the matrix and reinforcing materials include Carbon (C), silicon carbide (SiC), alumina ($Al_2O_3$) and mullite ($Al_2O_3$—$SiO_2$). As such, CMCs are typically named using a combination of the type of fiber/type of matrix. For example, C/C refers to carbon fiber-reinforced carbon, C/SiC for carbon fiber-reinforced silicon carbide, and SiC/SiC for silicon carbide fiber-reinforced silicon carbide. Compared to nickel-based superalloys, CMC materials can be prepared with extremely high thermal, mechanical, and chemical stability, while also maintaining a high strength-to-weight ratio. As such, CMC components, such as turbine blades, shrouds, and nozzles, may be employed to allow gas turbine engines to operate more efficiently and at higher temperatures. Unfortunately, CMCs do not exhibit acceptable environmental durability in typical combustion environments. In particular, water vapor produces during the combustion process can react with the CMC, e.g. to form gaseous reaction products such as $Si(OH)_4$, leading to loss of material, erosion, and/or surface recession of the CMC. To overcome these limitations, environmental barrier coatings (EBCs) are used on CMC components used in turbine engine hot zones, such as high-pressure turbine (HPT) shrouds and nozzles, to protect the base ceramic from the steam in the gas flow. Such components may also include a thermal barrier coating (TBC) (i.e., separate from any EBC), to insulate and minimize thermal impact on the engine structures due to temperature cycling, exposure to airborne contaminants such as calcia-magnesia-alumina-silicate (CMAS), etc.

Typically, formation of EBC is carried out after machining the structure of the component to be coated to a desired shape. For example, silicon-based ceramic substrates are generally formed through sintering processes, in which silicon-based powder and a sintering aid are shaped in a mold by batch powder addition until a desired thickness is reached. The powder is typically uniform in composition during the process, with relatively low amounts of sintering aid (e.g. less than about 5 wt. %, based on the total weight of the powder composition). The powder then cold pressed in the mold is (i.e., green body formation), and then fused (e.g. via glass encapsulation and subsequent sintering, pressureless sintering, or polymer infiltration and pyrolysis). Once sintered, the substrate is machined and annealed to achieve a target shape and tolerance parameters for the particular part being prepared. EBCs must be formed after sintering and machining of the substrate in order to both maintain dimensional tolerances in the part, as well as to prevent compromising the coverage of substrate by the EBC via machining the coating. Additionally, EBCs are typically formed via processes incompatible with the substrate sintering, such as plasma spray and electron beam physical vapor deposition (EB-PVD).

Unfortunately, conventional EBCs have practical limitations preventing use in desirable applications. For example, HPT surface temperatures may be targeted in excess of 2600° F. to improve performance characteristics and engine efficiency. However, conventional EBCs based on rare earth disilicates have a temperature limit of around 2400° F. in the HPT environment, above which the disilicate decomposes to a more stable monosilicate phase that is porous and has a higher coefficient of thermal expansion (CTE) than the substrate or the EBC itself. The porosity of the resulting monosilicate layer continuously exposes the underlying EBC to exhaust gasses, perpetuating the growth of the layer during operation. Moreover, the CTE differential may lead to stresses at the coating interface during cyclic heating to operating temperatures, which can result in delamination of the coating.

Compounding the performance issues above, conventional EBC materials often exhibit imperfect bonding to common substrate materials, and thus require the use of a bond coat to adhere the EBC to the CMC substrate. Many such bond coats are silicon-based, which limits the CMC system due to the low material performance of silicon in terms of temperature and mechanical stability, as the oxidation and degradation events set forth above are typically far greater for the silicon in the bond coat. As such, environmental exposure to such bond coats (e.g. via formation of a crack in the overlying EBC) can result in increased delamination and spallation of the EBC and failure of the system.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of a ceramic matrix composite (CMC) article is provided. The method includes depositing a coating composition directly onto a surface of a silicon carbide fiber-reinforced silicon carbide matrix (SiC/SiC) composite substrate to form a first layer thereon, with the coating composition comprising a rare earth silicate and a sintering aid. The method also includes heating the first layer to sinter the coating composition and thereby form an environmental barrier coating (EBC) adjacent the SiC/SiC composite substrate, and a transition layer integrally bonded to and between the SiC/SiC composite substrate and the EBC.

A CMC article (e.g. a coated part) is also provided. The coated part includes a SiC/SiC composite part body, an EBC adjacent the part body, and a transition layer integrally bonded to and between the SiC/SiC composite substrate and the EBC.

Other desirable features and characteristics of the apparatus and method will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
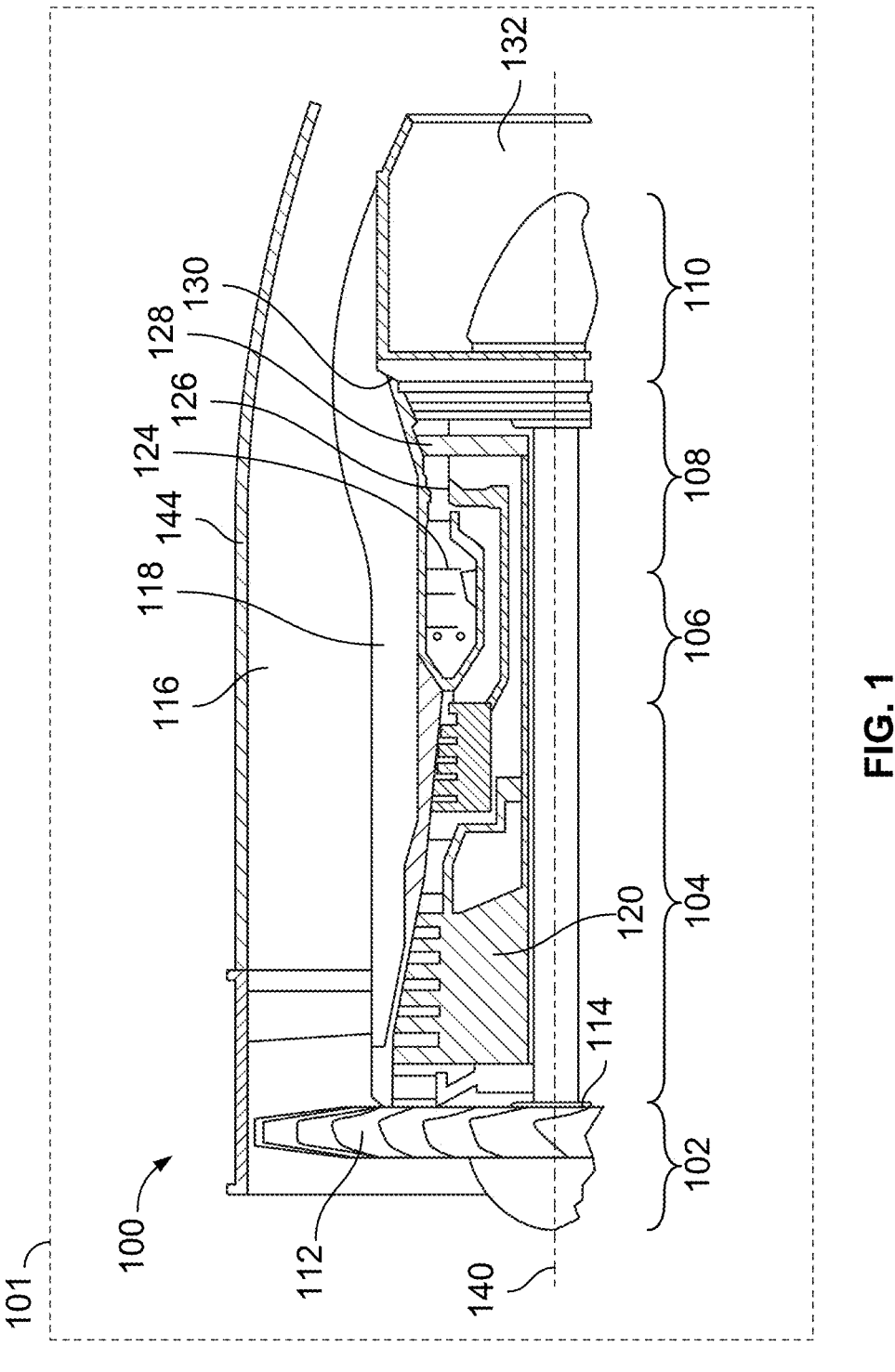
FIG. 1 is a schematic view of a gas turbine engine according to example embodiments of the present disclosure.

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure which is defined by the claims. Furthermore, there is no intention to be bound by any expressed or implied theory presented in the preceding technical field, background, brief summary, or the following detailed description.

An improved method for preparing a ceramic matrix composite (CMC) articles is provided herein. As described in detail below, the method comprises depositing a first layer of a coating composition directly onto a surface of a silicon carbide fiber-reinforced silicon carbide matrix (SiC/SiC) composite substrate. The method also comprises heating the first layer to sinter the coating composition to form an environmental barrier coating (EBC) adjacent the SiC/SiC composite and a transition layer integrally bonded to and between the substrate and the EBC. Both the EBC and the transition layer are formed during the same firing/heat treating step from the same coating composition used in the first layer. The coating composition comprises a rare earth silicate and a sintering aid, such that the EBC is formed predominantly of the rare earth silicate, and the transition layer is formed from the rare earth silicate and the SiC/SiC composite substrate.

CMC articles prepared with the method are also provided, and are exemplified by the turbomachinery parts/components introduced above. The articles generally comprise SiC/SiC composite substrates coated with the EBC, and optionally a thermal barrier coating (TBC). As introduced above, the EBC is bonded directly to the underlying ceramic component body (i.e., the SiC/SiC composite substrate) via an in situ-formed transition layer with excellent properties, thus eliminating reliance on an intervening bond coat for attachment purposes. Processing steps, requisite materials, and manufacturing costs associated with component production may be favorably reduced through the elimination of any such bond coat. Furthermore, failure paths commonly observed in bond coat-reliant coating systems and stemming from bond coat structural compromise may be mitigated. In the absence of the bond coat, an intimate and mechanically-robust bond may be created between the EBC and the underlying SiC/SiC composite utilizing a sinter bonding process, which results in the transition layer comprising a reaction product of a rare earth silicate and the SiC/SiC composite of the substrate.

In exemplary embodiments, the method utilizes rare earth disilicate powders and appropriate sintering aids to prepare the coating composition as a high-solids loading paste or slurry, which is applied directly to a substrate via doctor blading or airbrushing to give a dense and compact first layer (e.g. for efficient and effective sintering and interpenetration of the substrate during firing). The coating composition is then heat treated with specific heating profiles, first to dry and burn off organics and/or free silicon from the first layer (e.g. to reduce and/or prevent reduction of the disilicate materials), and subsequently to fire the rare earth silicate under inert atmosphere to form the EBC and the transition layer. Subsequent application and heat treatment of the coating composition may be utilized to increase the thickness of the EBC, or to form a second EBC of different composition. Outer coatings such as a thermal barrier coating (TBC) may be deposited onto the EBC once formed.

In general, the EBC provides an environmental barrier function by shielding the underlying component body from contaminants, such as combustive byproducts. When formed over a silicon-ceramic component body such as the SiC/SiC composites described herein, the EBC may resist penetration of high temperature mixtures of water vapor and oxygen (i.e., "steam"), which could otherwise drive recession of the underlying silicon-ceramic material by the mechanisms described above. The EBC may also serve as a thermal barrier due, at least in part, to a controlled, non-zero porosity within the coating body. However, the EBC may be implemented in addition to a TBC as described herein. The integrally-formed transition layer of the EBC may enhance strain compliance to better accommodate coefficient of thermal expansion (CTE) mismatches between EBC and the underlying SiC/SiC composite. The end result is a spallation-resistant, sinter-bonded high temperature coating, which can provide environmental barrier protection for various SiC/SiC composite turbomachine components.

It will be appreciated in view of the embodiments of the method set forth herein that the processes and chemistries of the method and the structure and properties of the coated article are best understood and illustrated in the context of each other. As such, the coating composition is described below in the general context of the method and relevant EBC chemistries and materials involved therewith, along with a description of the coated article in the context of the exemplary embodiments shown in the Figures.

FIG. 1 is a partial, cross-sectional view of an exemplary gas turbine engine 100 is shown, as illustrated in accordance with an exemplary embodiment of the present disclosure. As described below, the gas turbine engine 100 comprises many examples of ceramic turbomachine components over which the EBC herein can beneficially be formed. While certain components are specifically exemplified herein, it will appreciated that the EBC can be formed over various other turbomachine components in further embodiments. For example, in the context of gas turbine engines, gas-exposed surfaces of other components fabricated from SiC/SiC composites include turbine nozzles, duct members, compressor shrouds, compressor rotor blades, turbine rotor blades, etc.

With reference to FIG. 1, a partial, cross-sectional view of an exemplary gas turbine engine 100 is shown with remaining portions of the gas turbine engine 100 being substantially axisymmetric about a longitudinal axis 140, which also defines an axis of rotation for the gas turbine engine 100. In the depicted embodiments, the gas turbine engine 100 is an annular multi-spool turbofan gas turbine jet engine within an aircraft (represented schematically at 101), although it is to be understood that features of the present depicted embodiments may be included in other configurations, arrangements, and/or uses consistent with this disclosure. For example, in some embodiments, the gas turbine engine 100 may assume the form of a non-propulsive engine, such as an Auxiliary Power Unit (APU) deployed onboard the aircraft 101, alternatively as an industrial power generator, etc.

The gas turbine engine 100 generally includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116. The outer bypass duct 116 is generally defined by an outer casing 144 that is spaced apart from and surrounds an inner bypass duct 118. The remaining fraction of the compressed air exhausted from the fan 112 is directed into the compressor section 104, which includes one or more compressors 120. The number of compressors 120, and the configuration thereof, may vary. In general, the one or more compressors 120 sequentially raise the pressure of the air and direct a majority of the high-pressure fluid or air into the combustor section 106. In the combustor section 106, which includes a combustion chamber 124. The high-pressure air is mixed with fuel and is combusted in the combustion chamber 124, with the resulting high-temperature combustion air or combustive gas flow directed into the turbine section 108. The turbine section 108 is shown with three turbines disposed in axial flow series, namely, a high-pressure turbine 126, an intermediate pressure turbine 128, and a low-pressure turbine 130. However, it will be appreciated that the number of turbines, and/or the configurations thereof, may vary. In the embodiments illustrated, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 132. As the turbines

126, 128, 130 rotate, each drives equipment in the gas turbine engine 100 via concentrically disposed shafts or spools.

Figures 2, 3, 4:
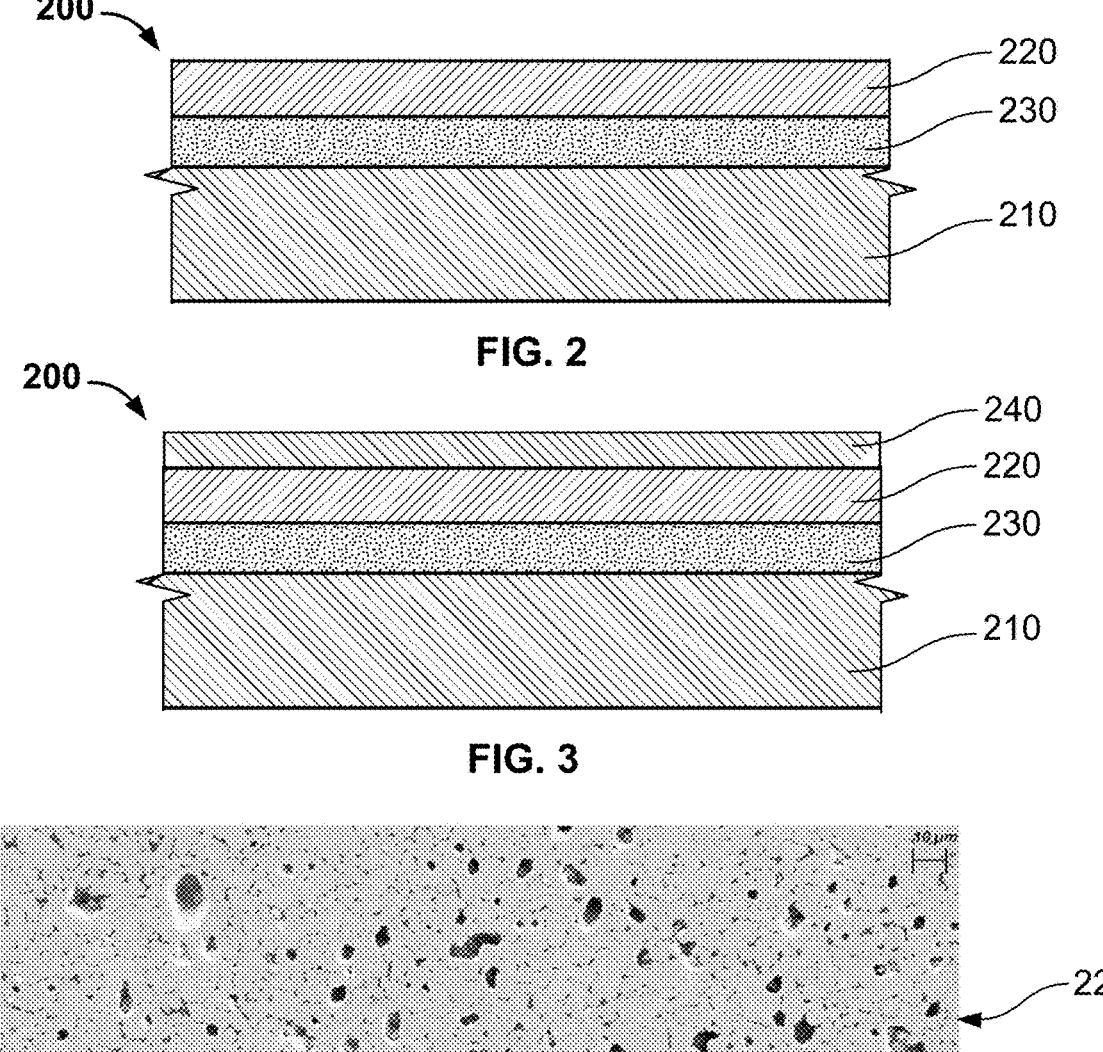
FIG. 2 is a schematic cross-sectional view of a part comprising a SiC—SiC substrate with an environmental barrier coating (EBC) according to embodiments of the present disclosure.
FIG. 3 is a schematic cross-sectional view of a part comprising a SiC—SiC substrate coated with an EBC and a thermal barrier coating (TBC) according to embodiments of the present disclosure.
FIG. 4 is a cross-sectional micrograph of a rare earth silicate EBC layer formed directly on a SiC—SiC substrate, and bonded thereto via an in situ formed interpenetrating transition layer, according to embodiments of the present disclosure.

Referring now to FIG. 2, a part 200 of the gas turbine engine 100 is shown schematically. It will be appreciated that the part 200 may be one of a variety of parts of the gas turbine engine 100 without departing from the scope of the present disclosure. The part 200 may have an airfoil shape. In some embodiments, the part 200 may be included in an area of the engine 100 subjected to high-temperature environments. Thus, the part 200 may be a component of the combustor section 106, a component of the turbine section 108, etc. More specifically, the part 200 may be a blade, a vane, or other component of the turbine section 108. It will also be appreciated that the part 200 may be a component of something other than a gas turbine engine 100 without departing from the scope of the present disclosure.

The part 200 includes a part body/substrate 210 that defines the majority of the part 200, an EBC 220 adjacent at least one surface of the part 200, as well as an intermediate/transition layer 230 integrally bonded to and between the substrate 210 and the EBC 220. As shown in FIG. 3, the part 200 may further comprise a top coat or outer layer 240 above the EBC 220. In some embodiments, for example, the outer layer 240 is a thermal barrier coating (TBC).

As introduced above, the part body 210 for purposes of the present embodiment comprises a SiC/SiC composite. In general, the part body 210 is a substrate that predominantly comprises a SiC/SiC composite, by wt. % and/or vol. %. In some embodiments, however, other silicon-based ceramic materials may be utilized, such as silicon nitride ($Si_3N_4$), as well composite ceramic materials of the same. The part body 210 generally serves as the base structure over which the EBC 220 is formed, and may be referred to as the "component body" or "substrate" 210. The part body 210 is not particularly limited, and may comprise any SiC/SiC composite material compatible with the chemistries and processes described herein. In general, the substrate material selected for the part body 210 will comprise a porosity sufficient to allow formation of the interpenetrating transition layer 230 described herein. In this fashion, the substrate materials of the part body 210 may be selected in view of the particular coating composition being utilized in the method.

Typically, the part body 210 is configured to be free from free silicon (Si) at least on the surface to be coated. In some embodiments, a surface of the part body 210 may be processed (e.g. etched) to selectively remove free silicon prior to coating. In typical embodiments, the body 210 is a preformed and/or machined component, such that no further machining is needed one the EBC 220 is formed thereon, for the reasons described above.

It will be appreciated that the dimensions of the part 200 are not shown to scale, and may vary considerably. In general, however, the EBC 220 will comprise a thickness of from >0 to about 30 mil. For example, in some embodiments the EBC 220 comprises a thickness of from about 1.5 to about 15 mils, such as from 1.5 to about 10 mils. While the EBC 220 will typically comprise a minimum thickness to provide adequate barrier protection properties to the system, the maximum thickness is not particularly limited and may be selected by one of skill in the art, e.g. in view of the type of component part 200 being prepared.

The transition layer 230 may also vary in thickness. In general, the transition layer 230 will comprise a thickness of from >0 to about 20 mil, such as from about 0.1 to about 10, alternatively from about 0.1 to about 5, alternatively from about 0.1 to about 3 mil. As introduced above, the transition layer 230 itself provides barrier protection to the underlying substrate 210. As such, the thickness of the EBC 220 and the transition layer 230 may be collectively configured, e.g. to a total thickness of from >0 to about 30 mil, alternatively from 0.1 to about 20 mil, alternatively from 0.1 to about 10 mil. It is to be appreciated that the thickness of the transition layer 230 may vary across different areas of the part 200, especially when the substrate 210 varies in porosity along the surface to be coated.

Figure 5:
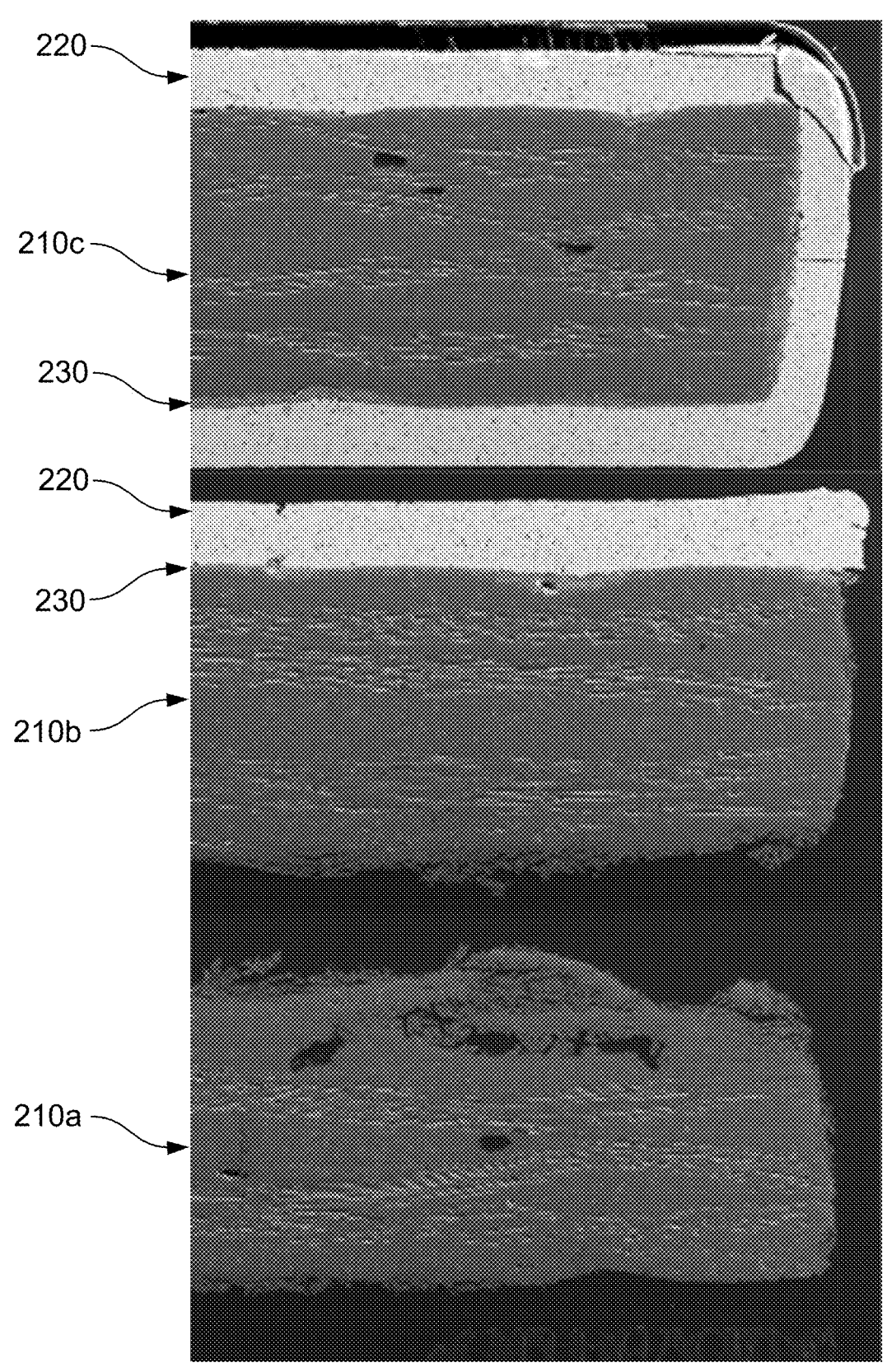
FIG. 5 is a stack plot of cross-sectional micrographs of a bare SiC—SiC substrate (bottom), along with a single-face EBC coated SiC—SiC substrate (middle) and an EBC-encapsulated SiC—SiC substrate (top) according to embodiments of the present disclosure, after oxidative environmental exposure in the Examples.

As shown in FIG. 5 and described in the examples below, the transition layer 230 and the EBC 220 may encapsulate at least a portion of the substrate 210, alternatively encapsulate substantially all of the substrate 210. Such configurations may be desirable to maximize the barrier protection of the substrate 210 provided by the EBC 220 and the transition layer 230, e.g. to prevent undercutting from exposure of uncoated areas to steam.

The EBC 220 and the transition layer 230 are formed simultaneously via sintering the coating composition on the surface of the substrate 210. The EBC 220 predominantly comprises the rare earth silicate, and the transition layer 230 comprises the reaction product of the rare earth silicate and the SiC/SiC composite material of the substrate 210.

In general, the EBC 220 comprises a substantially homogeneous or uniform chemical composition, as taken through its thickness. In this fashion, the side/face of the EBC 220 facing the substrate 210 may determined as where the material formed from the coating composition becomes predominately composed of the one or more rare earth silicates used in the coating composition, as opposed to the transition layer 230 which comprises material from both the coating composition as well as the SiC/SiC composite material.

Typically, the EBC 220 is predominately composed of the rare earth silicates from the coating composition, by wt. % and/or vol. %. Such rare earth silicates may be selected from mono and/or disilicates of gadolinium (GO), lanthanum (La), lutetium (Lu) neodymium (Nd), samarium (Sm), scandium (Sc), terbium (Tb), ytterbium (Yb), yttrium (Y), and combinations thereof. Typically, the rare earth silicate is a rare earth disilicate ($RE_2Si_2O_7$), where RE is one of the rare earth elements above, or combinations thereof. In some embodiments, the rare earth silicate is ytterbium disilicate ($Yb_2Si_2O_7$), yttrium disilicate ($Y_2Si_2O_7$), or a combination thereof. In particular embodiments, the EBC 220 predominantly comprises ytterbium disilicate. In such embodiments, the EBC 220 may comprise from about 80 to about 99 wt. % or more of ytterbium disilicate, such as from about 90 to about 99 wt. %, alternatively from about 95 to about 99 wt. %, based on the total weight of the EBC 220. It will be appreciated that further coatings may be applied to the EBC 220, such that the overall composition of an EBC system comprising the EBC 220 may have a different composition than the EBC 220 itself.

The EBC 220 may contain various other constituents in addition to one or more rare earth silicates. Other inorganic ceramic additives may be utilized in the coating composition to fine tune desired properties of the EBC 220. For example, as the coating composition utilizes a sintering aid, the EBC 220 may comprise the same, such as yttrium oxide ($Y_2O_3$), magnesia, alumina, etc. Typically, the EBC 220 comprises from about 0.5 to about 10 wt. % of the sintering aid. The EBC may also comprise small or trace amounts of other additives or impurities, such as lithia, borate, zinc oxide, etc. the EBC 220 may also each contain trace amounts of organic residue remaining from fugacious organic materials initially contained in the coating composition and thermally decomposed during heat treatment. Typically, however, the organic content of the EBC 220 is minimized to prevent unwanted reduction of disilicate. To this end, in some embodiments, the EBC 220 is substantially free from organics and/or free silicon. For example, in some embodiments, the EBC 220 comprises a combined about of organics and free silicon of less than about 1 wt. %, based on the total weight of the EBC 220. To achieve this end, the coating composition may be substantially free from organics and/or silicon components. In some embodiments, the sintering aid is substantially free from carbon and/or silicon. Sintering aids other than those specifically listed herein may also be utilized without departing from the scope of such embodiments so long as compatible with the chemistries described herein, as will be understood by those of skill in the art.

It is to be appreciated that the description of the constituents of the EBC 220 above may equally apply to the transition layer 230, insofar as both are prepared from the same coating composition. However, the composition of the transition layer 230 will necessarily also comprise constituent parts from the SiC/SiC composite and/or the reaction products thereof with the components of the coating composition.

Turning to the coating composition itself, it will be appreciated from the embodiments set forth above that the composition is formulated to be suitable for sintering to give the EBC 220 and the transition layer 230.

In general, the coating composition contains particulate solids, including the rare earth silicate(s), sintering aids, and other such constituents, which are non-fugacious in nature and remain in the EBC 220 and/or the transition layer 230 after sintering. Particle size, shape, composition, and distribution of the solids content within the coating composition is typically precisely controlled during formulation and application to the substrate 210 to yield desired results.

In general, the coating composition comprises from about 80 to about 99 wt. % of particles of the rare earth disilicate, based on the total weight solids of the coating composition. In such embodiments, the sintering aid particles may vary from about 0.1 to about 20 wt. %, based on the total weight solids of the coating composition. In particular embodiments, the coating composition comprises from about 0.5 to about 10 wt. % of magnesia and/or alumina sintering aid particles, and from about 90 to about 99.5 wt. % ytterbium disilicate particles, based on the total weight solids of the coating composition. In specific embodiments, the coating composition comprises from about 1 to about 5 wt. % of magnesia and/or alumina sintering aid particles, and from about 95 to about 99 wt. % ytterbium disilicate particles, based on the total weight solids of the coating composition. In certain embodiments, the coating composition comprises from about 1 to about 5 wt. % of alumina sintering aid particles and from about 95 to about 99 wt. % ytterbium disilicate particles, based on the total weight solids of the coating composition. In specific implementations of the embodiments above, the solids of the coating composition may consist essentially of the rare earth silicate and sintering aid components (i.e., where the total amount solids of rare earth silicate and the sintering aid in the coating composition is at least about 99 wt. %).

As indicated above, the coating composition may contain particles of the rare earth silicate (e.g., monosilicate or disilicate particles) and sintering aid of varying sizes and/or shapes. Suitable particle shapes include, but are not limited to, spherical, oblong, rod- or whisker-like, and platelet or laminae shapes. In some embodiments, the rare earth silicate particles have a first average minimum cross-sectional dimension (e.g. diameter in the case of spherical particles) and may be combined with lesser amounts (by wt. %) of one or more sintering aids. In some such embodiments, the sintering aid(s) may have, in turn, a second average minimum cross-sectional dimension (e.g. diameter) greater than the first average minimum cross-sectional dimension (e.g. diameter). In other such embodiments, the sintering aid(s) have a second average minimum cross-sectional dimension (e.g. diameter) less than the first average minimum cross-sectional dimension (e.g. diameter).

In general, the size of the particles utilized in the coating composition will be selected by one of skill in the art based on the shape of the particles selected, in view of the porosity and tortuosity of the substrate 210, e.g. to ensure appropriate interpenetration, reaction, and bonding thereto to form the transition layer 230. More specifically, as described further below, it will be appreciated that the general size of particles utilized in the coating composition (e.g. the rare earth silicate and the sintering aid) may enable the closing and/or reduction in pore size of the substrate 210 in the transition layer 230. Moreover, the relative size of the particles (i.e., the rare earth silicate vs. the sintering aid) will be selected to achieve desired processing and/or material properties of the transition layer 230 during and after formation. For example, in some embodiments, the sintering aid particles are selected to be smaller in size than the rare earth silicate particles to improve distribution of the sintering aid in the coating, as well as to minimize liquid generation at any one point during sintering (i.e., to increase the homogeneity of the liquid phase at the gran boundaries).

In some embodiments, the coating composition may comprise rare earth silicate (e.g. ytterbium disilicate) particles having an average minimum diameter of from about 1 to about 5 μm. However, it will be appreciated that particles comprising the rare earth silicate outside this range may also be used, such as those having an average minimum diameter (for substantially spherical particles) of from about 500 nm to about 20 μm. In this fashion, the rare earth silicate may be provided as nanoparticles, microparticles, or combinations thereof. Non-spherical particles may also be utilized, and will generally conform to similar size limitations.

In general, the sintering aid particles may be sized according to the parameters of the rare earth silicate particles described above, although smaller particles of the sintering aid may also be employed. In some embodiments, the coating composition comprises sintering aid (e.g. alumina) particles having an average minimum diameter of from about 1 nm to about 10 μm. In this fashion, the sintering aid particles may also be provided as nanoparticles, microparticles, or combinations thereof. In specific embodiments, the coating composition comprises sintering aid nanoparticles. In particular embodiments, rare earth silicate microparticles are utilized with sintering aid nanoparticles in the coating composition. In other embodiments, the coating composition comprises nanoparticles of the rare earth silicate and nanoparticles of the sintering aid.

As introduced above, other additives may be included in the solids content of the coating composition, as desired, including fibers or other particles added for reinforcement purposes. The coating composition may comprise fugacious or sacrificial organic ingredients, such as solvents, binders, surfactants, and other such processing aids, to produce the coating composition and/or the first layer therewith. Typically, the coating composition is deposited in a wet state, e.g. as a solution, suspension, paste, slurry, etc. In such embodiments, the coating composition comprises a carrier vehicle. Examples of carrier vehicles generally include solvents. For example, organic solvents are exemplified by methanol, ethanol, propanol, butanol, pentanol, hexanol, heptanol, octanol, nonanol, decanol, dodecanol, acetone, methyl isobutyl ketone (MIBK), methyl ethyl ketone (MEK), toluene, xylenes, alkylbenzenes (e.g. xylene), methoxybenzene, heptane, octane, nonane, decane, mineral spirits, naptha, tetrohydrofuran, and the like, as well as combinations thereof. The particular liquid components of the coating composition will be selected by one of skill in the art in view of the particular parameters and materials being utilized in the method.

In some embodiments, the coating composition comprises a liquid content including the carrier vehicle (e.g. a solvent, etc.) and, optionally a binder (e.g. isobutyl methacrylate, etc.) and/or a surfactant (e.g. alkyl phosphates or salts thereof, etc.). In such embodiments, the coating composition may comprise varying amounts of such components, such as from about 0 to about 50 vol. % binder, about 0 to about 10 vol. % surfactant, and from about 0 to about 100 vol. % solvent, based on the total liquid content of the coating composition.

It will be appreciated by those of skill in the art that the use of sintering aids may allow for reduced sintering temperatures, as well as for denser coating layers on application. The increase density of the first layer of the coating composition may allow for increased homogeneity and/or lower porosity of the resulting EBC 220 and/or transition layer 230 upon sintering, which can increase the barrier protection of the CMC substrate 210. Specifically, increasing the density of the EBC 220 and/or the transition layer 230 can reduce the penetration of oxygen, gases, and molten deposits from the engine environment during operation.

It will be appreciated that the given weight and volume ranges of the components above may also be utilized to inform one of skill in the art as to particular ratio(s) of the components of the coating composition, such that the coating composition need not be prepared as a discrete step prior to deposition, but may be instead be prepared in situ, i.e., during the deposition processes described herein. Typically, however, the coating composition is formulated ahead of deposition, and may subjected to various processing steps before use. For example, the coating composition (or a precursor thereof) may be screened and/or processed to achieve a desired particle size and/or distribution. While the particle size of the components is not particularly limited, controlling the size and/or shape of the particles in the coating composition may allow for tighter packing in the first layer, and subsequently increased homogeneity in the EBC 220 as described further below.

As introduced above, the coating composition is deposited on the substrate 210 to prepare the first layer therewith. Various deposition techniques may be utilized, with typical embodiments utilizing techniques allowing for application of a relatively thin first layer of the coating composition having a substantially homogenous distribution of solids, to achieve the thicknesses set forth above. Examples of such techniques includes painting, rolling, taping, screen printing, doctor blading, spin-coating, spray-coating, suspension/slip casting, dip-coating, and dry film transfer processes. Typically, the coating composition is deposited via doctor blading or airbrushing.

After deposition, the first layer is heat treated. Heat treatment is typically conducted in multiple stages or phases, and may be carried out utilizing any number of furnaces, ovens, or other heat treatment systems. Typically, heating the first layer of the coating composition comprises a burnout phase, in which the first layer of the coating composition is heated to a first temperature (T1) within a first time period, and subsequently a sintering phase in which the first layer of the coating composition is heated to a second temperature (T2) higher than T1 within a second time period.

The burnout phase is employed to dry and decompose organic materials contained within the coating composition. The burnout phase may include a gradual heating schedule, exemplified by a rate increase of from about 2 to about 6° C./min from a start temperature of about 200° C. to a peak temperature of about 600° C. (T1). The first time period at T1 may be from several minutes to several hours, such as from greater than 0 to about 10 hours, and will be selected based on the layer thickness, quantity and type of fugacious materials being removed, etc. The burnout phase may be carried out in an open air environment or alternatively in an inert, non-oxidizing, and/or vacuum atmosphere.

The sintering phase typically comprises a higher temperature, rapid heating process, and is employed to sinter and densify first layer to give the EBC 220 and the transition layer 230. Exemplary peak temperatures (T2) during the sintering phase may range from about 1000 to about 1800° C., such as from about 1100 to about 1800, alternatively from 1400 to about 1800° C., with hold times at T2 of from greater than 0 to about 24 hours. The sintering phase may utilize a relatively aggressive heating ramp to reach T2, such as at a rate of about 300° C./min or more. For example, the sintering phase may include heating the first layer from about room temperature to a T2 of greater than about 1500° C. in a period of less than about 10, alternatively about 5 minutes. The sintering phase is typically conducted under inert conditions, e.g. under at least a non-oxidizing atmosphere, optionally under vacuum.

In some embodiments, the method further includes additional steps, such precision machining, additional heat treatments, deposition/formation of additional coating layers over the EBC 220, etc. For example, in some embodiments, the method further comprises depositing a layer of a second coating composition over the EBC 220, and subsequently heating the second layer to form a second EBC bonded to the EBC 220 prepared from the first coating composition. In some such embodiments, the first and second coating compositions are substantially the same such that the second EBC is formed as a continuation of the first, with the first and second EBC represented at 220 in FIG. 2. In other embodiments, however, as illustrated in FIG. 3, a unique layer is prepared as a top coat 240. The top coat 240 may be another EBC or a TBC. In some embodiments, the method comprises preparing the EBC 220 from at least one secondary deposition and sintering. In some such embodiments, the method

EXAMPLES

The following examples, illustrating various embodiments of this disclosure, are intended to illustrate and not to limit the scope of the embodiments described herein. Unless otherwise noted, all solvents, substrates, and reagents are purchased or otherwise obtained from various commercial suppliers (e.g. Sigma-Aldrich, VWR, Alfa Aesar, etc.) and utilized as received (i.e., without further purification) or as in a form used conventionally in the art, or as prepared from conventional procedures known in the art.

Example 1: A coating composition slurry is prepared by sizing particles of ytterbium disilicate, and combining the sized particles with a sintering aid (alumina or mullite, 1%), a carrier vehicle, and a binder. The slurry is applied directly to a surface of a SiC/SiC ceramic matrix composite via doctor blading to give a first layer, which is then heat treated to burn out residual organics. The resulting coated substrate is then fired to sinter the ytterbium disilicate and give a CMC article comprising an EBC directly bonded to the SiC/SiC substrate via an interpenetrating transition layer. A second portion of the coating composition is then applied over the EBC and heat treated as set forth above to increase the thickness of the EBC.

A scanning electron microscope (SEM) was used to prepare a cross-sectional micrograph of the CMC article, shown in FIG. 4. The SEM micrograph clearly shows the EBC 220 directly bonded to the underlying SiC/SiC substrate 220 via the interpenetrating transition layer 230, without the presence of a bond coat.

Example 2: A SiC/SiC CMC article is prepared with an EBC on one surface of the SiC/SiC substrate according to the process set forth in Example 1. The SiC/SiC CMC article is then exposed to exposed to 2400° F. (1316° C.) steam for 1100 hours.

Example 3: A second SiC/SiC CMC article is prepared with an EBC encapsulating the SiC/SiC substrate according to the process set forth in Example 1. The SiC/SiC CMC article is then exposed to exposed to 2400° F. (1316° C.) steam for 1100 hours.

Comparative Example 1: An uncoated SiC/SiC CMC substrate as used in Examples 2-3 is exposed to 2400° F. (1316° C.) steam for 1100 hours.

A stack plot of cross-sectional micrographs taken of each CMC article is shown in FIG. 5. Comparative Example 1 is shown at the bottom, with uncoated SiC/SiC substrate 210*a*. Example 2 is shown in the middle, with the SiC/SiC substrate 210*b* having the single-face EBC 220. Example 3 is shown at the top, with the SiC/SiC 210*c* encapsulated by the EBC 220.

As shown, the EBC significantly reduces spallation of the SiC/SiC substrate upon exposure to steam, with no delamination of the EBC apparent even after long exposure times. Notably, in Example 3, the CMC article comprising the encapsulated second SiC/SiC 210*c* exhibited a sintering mudcrack on one side traversing the entire EBC 220. However, the transition layer 230 appears largely intact, maintaining a marked reduction in spallation of the SiC/SiC substrate as compared to the uncoated SiC/SiC substrate 210*a* of Comparative Example 1 and the uncoated portions of the first SiC/SiC substrate 210*b* in Example 2.

As demonstrated above, the method of the present embodiments provides CMC articles 200 (e.g. turbomachine parts) with enhanced barrier protection even when the overlying EBC is cracked or damaged. More specifically, the transition layer, which is steam resistant, provides barrier protection via closing the open porosity and tortuosity of the underlying substrate 210, thereby reducing the ability of steam to undercut the substrate 210. As such, CMC articles 200 prepared according to the method exhibit increased steam resistance, demonstrated by a markedly reduced rate of damage to substrate 210 upon prolonged steam exposure, in examples of both intact and compromised layers of the EBC 220.

As will be understood in view of the embodiments exemplified and described herein, the method provides environmental resistant CMC articles comprising EBCs directly bonded to the SiC/SiC composite substrate, via a transition layer formed in-situ alongside the EBC. Said differently, the transition layer is selectively prepared during formation of the EBC in view of the both the coating composition and the SiC/SiC composite being utilized, resulting in a unique and markedly improved properties benefitting the CMC articles prepared therewith. In particular, the transition layer penetrates into the substrate and provides excellent adhesion, the method eliminates the need for a bond coat, thereby eliminating deleterious issues associated with free silicon in the rare earth silicate EBC compositions. Moreover, the transition layer alters the composition of the underlying substrate matrix, increases the compatibility between the coating composition and the SiC/SiC composite utilized, and transitions the CTE between the adjacent layers. As such, method provided herein reduces, minimizes, and/or eliminates the CTE mismatch, incompatibility, and delamination issues associated with conventional EBC-coated SiC/SiC composites.

In addition to enhancing the mechanical strength of the interface between the substrate and the EBC, the transition layer itself also exhibits good properties at high temperatures and is inherently steam resistant, thus also improving the high-temperature performance of the CMC articles prepared therewith. Such coated articles (e.g. component bodies comprising the EBC) exhibit reduced delamination and spallation compared to untreated SiC/SiC substrates. Moreover, the EBC prepared with the methods herein has been demonstrated to outperform current industry standards using Si bond coats across a multi-cyclic high-temperature steam test.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of preparing a ceramic matrix composite (CMC) article, the method comprising:
   depositing a first layer of a coating composition directly onto a surface of a silicon carbide fiber-reinforced silicon carbide matrix (SiC/SiC) composite substrate, the coating composition comprising a rare earth silicate and a sintering aid; and
   heating the first layer to sinter the coating composition to form an environmental barrier coating (EBC) adjacent the SiC/SiC composite substrate and a transition layer integrally bonded to and between the SiC/SiC composite substrate and the EBC, thereby preparing the CMC article, wherein the transition layer comprises a reaction product of the rare earth silicate of the coating composition and the SiC/SiC composite substrate, wherein the transition layer has a thickness of from 3 to 10 mils, and the EBC has a thickness of from 1.5 to 10 mils.

2. The method of claim 1, wherein the surface of the SiC/SiC composite substrate on which the first layer of the coating composition is deposited is free from a bond coating.

3. The method of claim 1, wherein the first layer of the coating composition is deposited via direct application to the SiC/SiC composite substrate by doctor blading or airbrushing.

4. The method of claim 3, wherein the coating composition is in the form of a slurry or paste, and wherein method further comprises preparing the slurry or paste prior to depositing the first layer thereof by combining particles of the rare earth silicate, particles of the sintering aid, a carrier vehicle, and optionally a binder.

5. The method of claim 1, wherein heating the first layer of the coating composition comprises:
   a burnout phase in which the first layer of the coating composition is heated to a first temperature (T1) within a first time period, and subsequently
   a sintering phase in which the first layer of the coating composition is heated to a second temperature (T2) higher than T1 within a second time period.

6. The method of claim 5, wherein during the sintering phase, the first layer of the coating composition is substantially free from: (i) carbon; (ii) free silicon; or (iii) both (i) and (ii).

7. The method of claim 5, wherein the second temperature (T2) and the second time period are selected to prepare the transition layer comprising the reaction product of the rare earth silicate of the coating composition and the SiC/SiC composite substrate.

8. The method of claim 1, wherein the rare earth silicate is further defined as a rare earth disilicate ($RE_2Si_2O_7$), and wherein the first coating composition comprises from about 80 to about 99 wt. % of the rare earth disilicate, based on the total weight solids of the first coating composition.

9. The method of claim 8, wherein the rare earth silicate comprises ytterbium disilicate ($Yb_2Si_2O_7$).

10. The method of claim 9, wherein the coating composition comprises from about 1 to about 20 wt. % of the sintering aid, based on the total weight solids of the first coating composition.

11. The method of claim 1, wherein the sintering aid comprises alumina ($Al_2O_3$).

12. The method of claim 1, wherein the sintering aid is substantially free from: (i) carbon; (ii) silicon; or (iii) both (i) and (ii).

13. The method of claim 1, further comprising depositing a layer of a second coating composition over the EBC; and heating the second layer to form a second EBC bonded to the EBC prepared from the first coating composition.

14. The method of claim 13, wherein the first and second coating compositions are substantially the same.

15. The method of claim 1, wherein the SiC/SiC composite substrate is a part body, and wherein depositing the first layer of the coating composition comprises encapsulating at least a portion of the part body with the coating composition.

16. The method of claim 1, further comprising disposing a thermal barrier coating (TBC) over the EBC.

17. The method of claim 1, wherein:

the EBC has a first coefficient of thermal expansion (CTE);

the transition layer has a second CTE; and the SiC/SiC composite substrate has a third CTE, wherein the second CTE more closely matches the third CTE than the first CTE matches the third CTE, and this closer match is achieved because the transition layer includes a reaction product formed from the rare earth silicate of the coating composition and the SiC/SiC composite substrate.

\* \* \* \* \*